(12) United States Patent
Bunge et al.

(10) Patent No.: US 6,929,675 B1
(45) Date of Patent: Aug. 16, 2005

(54) SYNTHESIS METAL NANOPARTICLE

(75) Inventors: Scott D. Bunge, Albuquerque, NM (US); Timothy J. Boyle, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 280 days.

(21) Appl. No.: 10/424,231

(22) Filed: Apr. 24, 2003

(51) Int. Cl.[7] ................................................ B22F 9/24
(52) U.S. Cl. ........................... 75/362; 75/369; 75/371; 75/373
(58) Field of Search ........................ 75/362, 369, 371, 75/373

(56) References Cited

U.S. PATENT DOCUMENTS

| | | | |
|---|---|---|---|
| 5,147,841 A | * | 9/1992 | Wilcoxon .................... 502/173 |
| 6,103,868 A | | 8/2000 | Heath et al. ................. 528/482 |
| 6,838,486 B2 | * | 1/2005 | Ryang ......................... 516/90 |

OTHER PUBLICATIONS

Bunge, Scott D. et al.,"Synthesis of Coinage-Metal Nanoparticles from Mesityl Precursors", Nano Letters, 2003, vol. 3, No. 7, pp. 901-905, publsihed on Web Jun. 19, 2003.*

Templeton, et al., "Monolayer-Protected Cluster Molecules, "*Accounts of Chemical Research*, 2000, 33, 27-36.

Brust, et al., "Synthesis of Thiol-derivatised Gold Nanoparticles in a Two-phase Liquid—Liquid System"*J. Chem. Soc.,Chem. Commun.*, 1994, 801-802.

Dhas, et al., "Synthesis, Characterization, and Properties of Metallic Copper Nanoparticles" Chem. Mater., 1998, 10, pp. 1446-1452.

Sarathy, et al., "A novel method of preparing thiol-derivatised nanoparticles of gold, platinum and silver forming superstructures,"*Chem. Commun.*, 1997, 537-538.

Jana, et al., "Seed-Mediated Growth Approach for Shape-Controlled Synthesis of Spheroidal and Rod-like Gold Nanoparticles Using a Surfactant Template**"*Adv. Mater.*, 2001, 1389-1393.

Jana, et al., "Seeding Growth for Size Control of 5-40 nm Diameter Gold Nanoparticles,"*Langmui*, 2001, 17, 6782-6786.

* cited by examiner

*Primary Examiner*—George Wyszomierski
(74) *Attorney, Agent, or Firm*—Elmer A. Klavetter

(57) ABSTRACT

A method for providing an anhydrous route for the synthesis of amine capped coinage-metal (copper, silver, and gold) nanoparticles (NPs) using the coinage-metal mesityl (mesityl=$C_6H_2(CH_3)_3$-2,4,6) derivatives. In this method, a solution of ($Cu(C_6H_2(CH_3)_3)_5$, ($Ag(C_6H_2(CH_3)_3)_4$, or ($Au(C_6H_2(CH_3)_3)_5$ is dissolved in a coordinating solvent, such as a primary, secondary, or tertiary amine; primary, secondary, or tertiary phosphine, or alkyl thiol, to produce a mesityl precursor solution. This solution is subsequently injected into an organic solvent that is heated to a temperature greater than approximately 100° C. After washing with an organic solvent, such as an alcohol (including methanol, ethanol, propanol, and higher molecular-weight alcohols), oxide free coinage NP are prepared that could be extracted with a solvent, such as an aromatic solvent (including, for example, toluene, benzene, and pyridine) or an alkane (including, for example, pentane, hexane, and heptane). Characterization by UV-Vis spectroscopy and transmission electron microscopy showed that the NPs were approximately 9.2±2.3 nm in size for Cu°, (no surface oxide present), approximately 8.5±1.1 nm Ag° spheres, and approximately 8–80 nm for Au°.

13 Claims, 3 Drawing Sheets

SYNTHESIS METAL NANOPARTICLE

This invention was made with Government support under Contract No. DE-AC 04-94AL85000 awarded by the Department of Energy. The Government has certain rights in the invention.

BACKGROUND OF THE INVENTION

The present invention relates generally to a method of making metal nanoparticles and, more particularly, to a method of making metal nanoparticles from mesityl precursors.

Synthesis of coinage nanoparticles (NP) has been available for over a century but control over their size and monodispersity had not been realized until recently. Research in this endeavor has focused on the synthesis, ordering, and properties of coinage-metal NP due to the dependence of the NP optical properties on the shape and size of the NP. This phenomenon is attributed to the particularly strong surface plasmon oscillations within these metals.

Salt reduction methods have been used in the formation of Group 11 (copper, silver, and gold) NPs. In one method, two-phase reduction of $AuCl_4^-$ by $NaBH_4$ has been used to afford mono-dispersed 3 nm gold particles passivated by nonanethiol. This method is widely employed to synthesize monodisperse gold, silver, and copper oxide coated copper NPs. These are often stabilized by a number of passifying agents, including alkanethiols, phosphanes, quaternary ammonium salts, surfactants and polymers. However, current synthesis methods typically require complex starting materials, reducing agents and special additives (such as detergents), and produce salts or other difficult to remove by-products. Current methods also typically require multi-step "seed-growth" steps followed by post-synthetic purification techniques to generate coinage-metal NPs of various sizes.

DETAILED DESCRIPTION OF THE INVENTION

Figure 1:
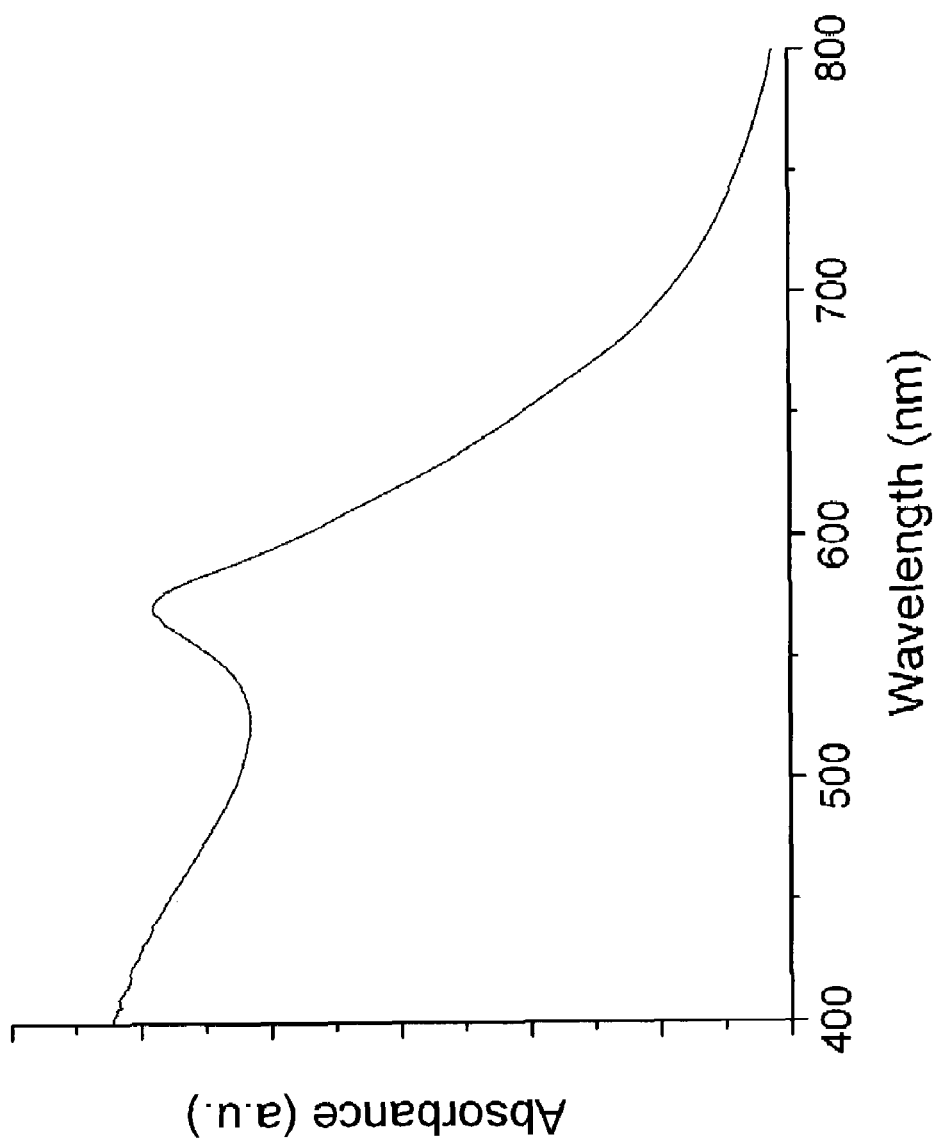
FIG. 1 shows the UV/VIS absorption spectrum of copper nanoparticles prepared by the method of the present invention.

The present invention relates to a method for synthesizing coinage-metal (gold, silver, and copper) nanoparticles. The method of the present invention provides an anhydrous route for the synthesis of amine capped coinage-metal nanoparticles (NPs) using the coinage-metal mesityl (mesityl=$C_6H_2(CH_3)_3$-2,4,6) derivatives. In this method, a solution of either $(Cu(C_6H_2(CH_3)_3))_5$, $(Ag(C_6H_2(CH_3)_3))_4$, or $(Au(C_6H_2(CH_3)_3))_5$, alternatively written as $(Cu(\mu\text{-mesityl}))_5$, $(Ag(\mu\text{-mesityl}))_4$, or $(Au(\mu\text{-mesityl}))_5$, is dissolved in a coordinating solvent, such as a primary, secondary, or tertiary amine; primary, secondary, or tertiary phosphine, or alkyl thiol, to produce a mesityl precursor solution. This solution is subsequently injected into an organic solvent that is heated to a temperature greater than approximately 100° C. After washing with an organic solvent, such as an alcohol (including methanol, ethanol, propanol, and higher molecular-weight alcohols), oxide free coinage NP were prepared that could be extracted with a solvent, such as an aromatic solvent (including, for example, toluene, benzene, and pyridine) or an alkane (including, for example, pentane, hexane, and heptane). Characterization by UV-Vis spectroscopy and transmission electron microscopy showed that the NPs were approximately 9.2±2.3 nm in size for Cu°, (no surface oxide present), approximately 8.5±1.1 nm Ag° spheres, and approximately 8–80 nm for Au°. Reducing the concentration of the precursor solution, temperature of the amine solution, and time of reaction led to the synthesis of Au° NP of 12±1 nm in size.

Crystalline $(Cu(\mu\text{-mesityl}))_5$, $(Ag(\mu\text{-mesityl}))_4$, or $(Au(\mu\text{-mesityl}))_5$ were prepared by a slightly modified standard procedure. These complexes were selected based on their clean decomposition pathways, lack of potential halide contamination, facile synthesis; because they are solids at ambient conditions, that simplifies the handling and storage of these compounds. Although the use of oligomeric metal complexes as synthons for NPs has been explored for a variety of metals, typically these oligomeric metal complexes are difficult to synthesize, have undesirable byproducts, or are inflexible oligomeric molecules composed of hundreds of atoms. The method of the present invention provides for "small" metal clusters, with easily vaporized byproducts that allow for more control over the growth of the NPs and facilitate the focused sized distribution of the colloids. Mesityl derivatives have not been utilized in this manner.

In order to examine the thermal behavior of $(Cu(\mu\text{-mesityl}))_5$, $(Ag(\mu\text{-mesityl}))_4$, and $(Au(\mu\text{-mesityl}))_5$, as well as to determine an injection temperature for the coordinating solvent to insure clean ligand decomposition, thermogravimetric analyses (TA Instruments STD2960) under flowing argon were performed. All three mesityl complexes exhibit weight loss between 25 and 100° C. that corresponds to the loss of toluene molecules present in the crystalline lattice. Between 150 and 200° C., weight losses attributable to the thermal decomposition of the ligand and conversion to the respective noble metals were observed. It should be noted that for the case of mesityl complex $(Ag(\mu\text{-mesityl}))_4$, rigorous light exclusion was not performed while heating the sample and therefore a photodecomposition pathway to silver metal can not be excluded as a possibility.

The synthesis of copper NPs was performed under an argon atmosphere, wherein a magnetically stirred hexadecylamine solution (7 g, 29 mmol) was heated to 300° C. and then 4 mL of a 0.3 M solution of $(Cu(\mu\text{-mesityl}))_5$ in octylamine was rapidly injected which turned the previously colorless solution to dark red. The solution was then heated at 225° C. for 30 min and then cooled to room temperature. Toluene (20 mL) was then added to the solid reaction mixture, yielding a deep red dispersion. Further purification was achieved by addition of methanol (100 mL) forming a clear colorless solution and a red precipitate. The precipitate was separated by centrifugation (3300 rpm/25 min) carried out in an argon-filled glove box and then re-dispersed in toluene. The resulting colloid is stable at room temperature in the absence of air.

Consistent with previous reports of similar-sized amine capped Cu° particles, the UV/VIS (Varian Carey 400) spectrum in toluene displays a sharp absorption peak at 568 nm (see FIG. 1) consistent with particles on the order of 8 nm. Under an argon atmosphere, a drop of the Cu° NPs dispersed in toluene was deposited on a 30-mesh carbon coated copper TEM grid. The TEM image confirms the formation of Cu° NPs as well-defined, spherical particles with a diameter of approximately 9 nm. Additionally, no evidence of an oxide layer was observed for these particles. The size and shape of the nanocrystals are uniform and the individual particles are separated by about 2 nm due to shells of surfactant. The size distribution leads to the formation of hexagonally 2-D ordered lattices of free standing copper colloids.

HRTEM images of the Cu° NPs were obtained and revealed the anticipated lattice planes for FCC cubic Cu°. The corresponding selected area electron diffraction (SAED) pattern was also obtained. Devoid of evidence of copper(I) oxide and copper(II) oxide, the four rings correspond to the lattice planes (111), (200), (220) and (311), matching the cubic phase for copper.

The preparation of Ag° NPs were prepared by rapidly injecting a 0.3 M solution of $(Ag(\mu\text{-mesityl}))_4$ in octylamine (4 mL) into a 300° C. hexadecylamine solution (7 g, 29 mmol) under an argon atmosphere. Upon injection, the colorless amine solution immediately turned dark yellow/brown. The solution was then heated at 225° C. for 5 min, the reaction was quenched by cooling the reaction to room temperature, and toluene was added to yield a dark yellow-brown dispersion. Methanol was added yielding a clear colorless solution and a yellow-brown precipitate. The precipitate was separated by centrifugation undertaken in an argon-filled glove box and then re-dispersed in toluene.

Figure 2:
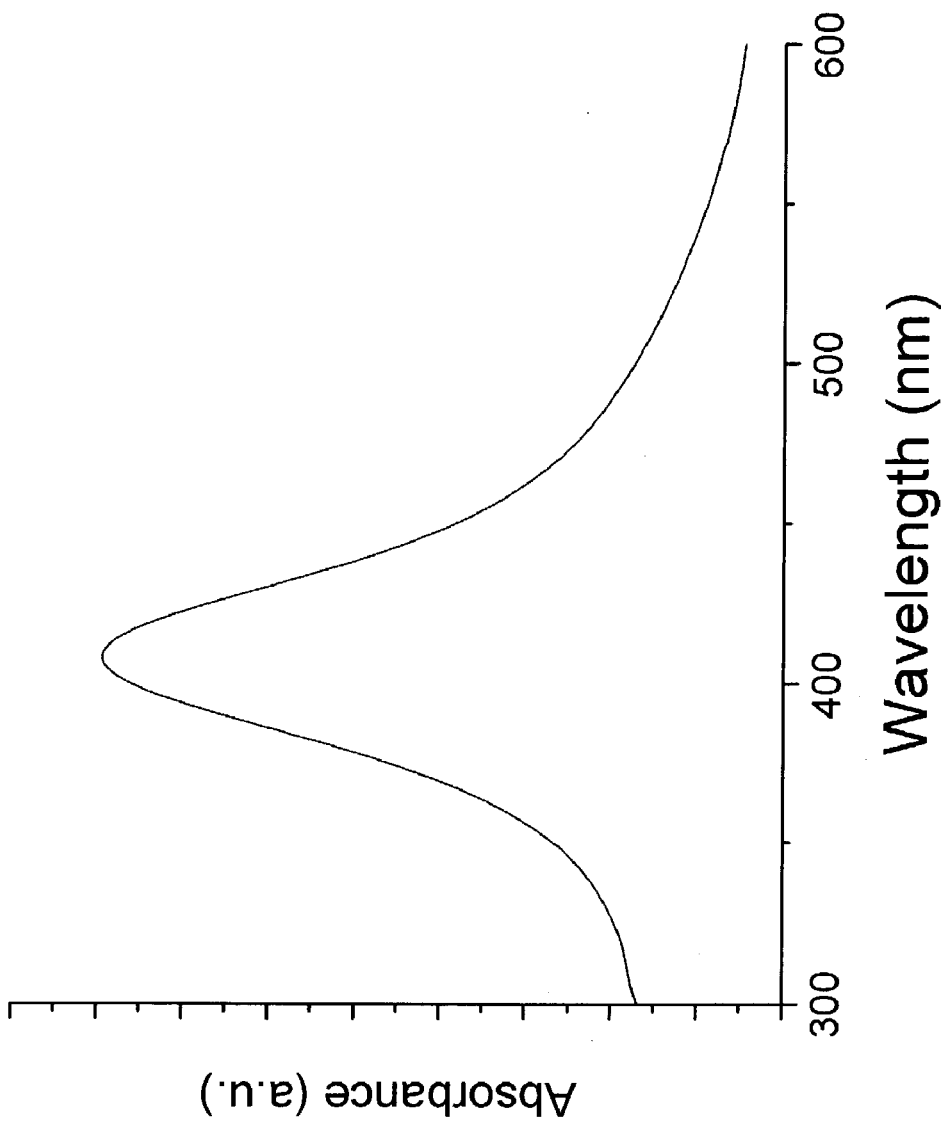
FIG. 2 shows the UV/VIS absorption spectrum of silver nanoparticles prepared by the method of the present invention.

The UV-VIS spectrum of a clear yellow toluene solution containing Ag° NPs displays a sharp absorption peak at 468 nm (FIG. 2) which is consistent for amine-coated Ag° nanoparticles of approximately 9 nm in size. Under an argon atmosphere, a drop of the Ag° NPs dispersed in toluene was deposited on a 30-mesh carbon coated copper TEM grid. The TEM image confirmed the formation of Ag° NPs as well-defined, spherical particles with a diameter of about 9 nm. The size and shape of the nanocrystals are uniform and the individual particles are separated by about 2 nm due to shells of surfactant. The small size distribution leads to the formation of hexagonally 2-D ordered lattices of free standing silver colloids.

The synthesis of Au° NPs was first performed under conditions similar to the previously described coinage NPs. However, upon injection of the 0.3 M solution of $(Au(\mu\text{-mesityl}))_5$ in octylamine into a 300° C. hexadecylamine solution, a rapid (greater than approximately 30 sec) transformation from colorless to dark purple occurred. The heating of the sample was stopped and the reaction was allowed to cool to room temperature with additional manipulation performed in an argon-filled glove box. The UV-VIS spectrum of the Au° NPs dispersed in toluene did not yield an absorption band that is indicative of a broad size distribution. A drop of the Au° NPs dispersed in toluene was deposited on a 30-mesh carbon coated copper TEM grid. The TEM image confirmed the presence of spherical, oval, elongated and cylindrical gold NPs ranging in size from 10 to 80 nm.

Figure 3:
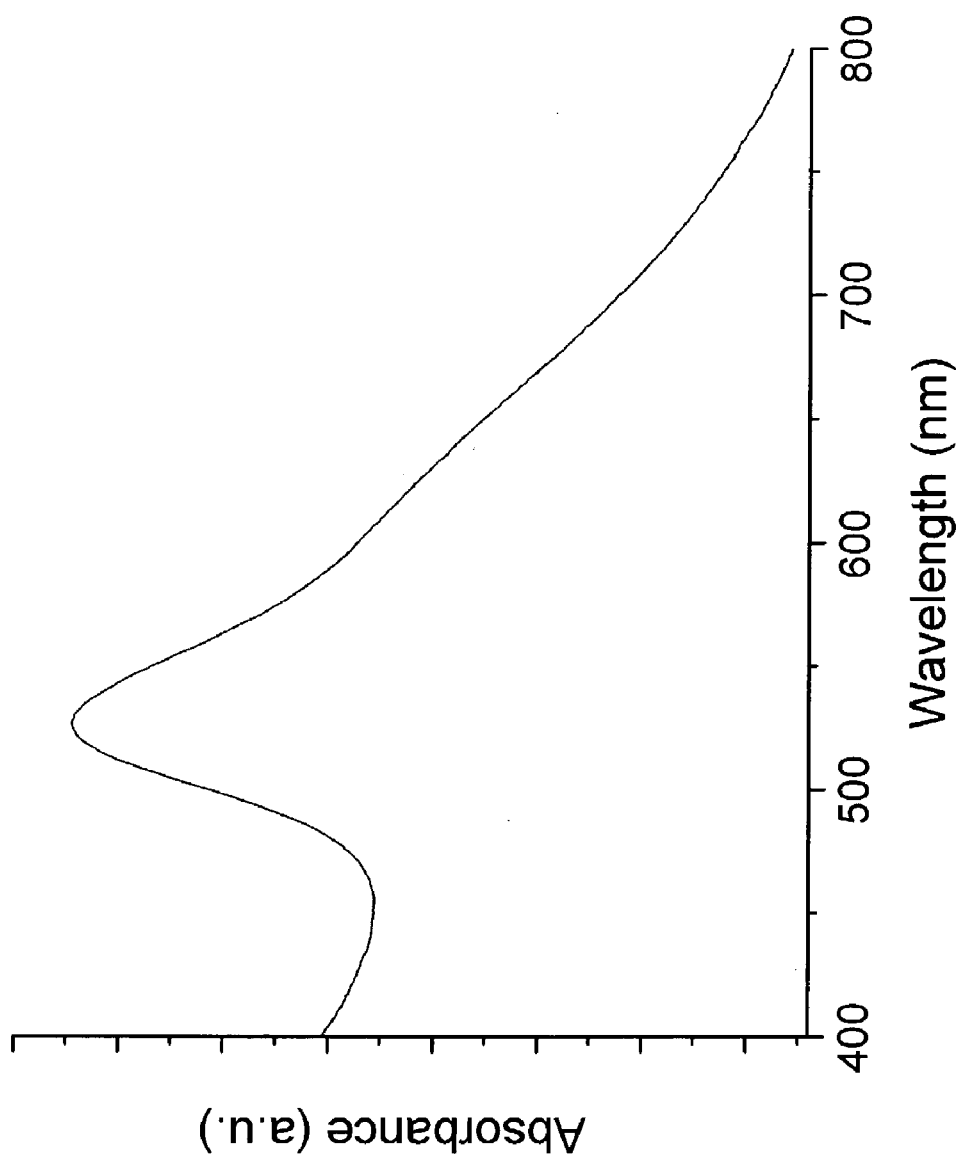
FIG. 3 shows the UV/VIS absorption spectrum of gold nanoparticles prepared by the method of the present invention.

Due to the increased growth rate for this reaction, versus Cu° and Ag°, and the non-homogeneity of the resultant particles, it was of interest to alter conditions to slow the growth of Au° NPs. Therefore, a more dilute solution of $(Au(\mu\text{-mesityl}))_5$ (0.015 M) in octylamine was injected into a cooler (190° C.) solution of trioctyl phosphonic acid (TOPO, 90%) and allowed to stir at 150° C. for 1 min. This produced a bright reddish-purple solution. The reaction mixture was handled as before. The UV-VIS spectrum of a purple toluene solution containing the Au° NPs displays a sharp absorption peak at 468 nm (FIG. 3). Utilizing electron microscopy (TEM) image of the spherical gold nanoparticles with the UV-VIS spectrum, it was determined that the Au° particles were characterized by a narrow size distribution from 12±1 nm.

The experimental results demonstrated that thermolysis of the mesityl coinage precursors can successfully be used to generate oxide free metal nanoparticles passivated by amino groups. The particles isolated were spherical and on the size of 2 nm for Cu°, 9 nm for Ag°, and 12 nm for Au°. It is of note that the Cu° were oxide free and the lattice planes of the FCC crystallites were observed by TEM. Combined, the characteristics of the capping ligand, the temperature of the reaction system, and the ratio of capping ligand to metallic precursor were used to impart control over the morphology of the coinage-metal nanoparticles. Increased steric bulk of the capping ligand, lower overall reaction temperatures, and a low precursor to ligand concentration combine to favor slower growth and thus result in relatively small and uniform particle sizes.

The invention being thus described, it will be apparent to those skilled in the art that the same may be varied in many ways. Such variations are not to be regarded as a departure from the spirit and scope of the invention, and all such modifications are intended to be included within the scope of the following claims.

We claim:

1. A method of making coinage-metal nanoparticles, comprising:
    dissolving a solution of a metal mesityl compound, selected from $(Cu(C_6H_2(CH_3)_3)_5$, $(Ag(C_6H_2(CH_3)_3)_4$, and $(Au(C_6H_2(CH_3)_3)_5$, in a coordinating solvent to form a mesityl precursor solution; and mixing said mesityl precursor solution in a second solvent at a temperature greater than approximately 100° C. to form coinage-metal nanoparticles in solution.

2. The method of claim 1 wherein said coordinating solvent is selected from the group consisting of a primary amine, a secondary amine, a tertiary amine, a primary phosphine, a secondary phosphine, a tertiary phosphine, and an alkyl thiol.

3. The method of claim 1 wherein said coordinating solvent is octylamine.

4. The method of claim 1 where said second solvent is selected from the group consisting essentially of a primary amine, a secondary amine, and a tertiary amine.

5. The method of claim 1 further comprising the step of washing the coinage-metal nanoparticles in solution with a first organic solvent to form a precipitate of coinage-metal nanoparticles.

6. The method of claim 5 wherein the first organic solvent is an alcohol.

7. The method of claim 5 further comprising the step of extracting from solution coinage-metal nanoparticles with a solvent selected from an aromatic solvent and an alkane.

8. The method of claim 1 wherein forming coinage-metal nanoparticles in solution was performed under an inert atmosphere.

9. A method of making copper nanoparticles, comprising:
    dissolving a solution of $(Cu(C_6H_2(CH_3)_3)_5$ in an octylamine solvent to form a mesityl precursor solution;
    mixing said mesityl precursor solution in a hexadecylamine solvent at a temperature of approximately 300° C. to form coinage-metal nanoparticles in solution;

adding methanol to form a precipitate; and separating the precipitate to form copper nanoparticles with diameters of approximately 8 nm.

10. A method of making silver nanoparticles, comprising:

dissolving a solution of $(Ag(C_6H_2(CH_3)_3)_4$ in an octylamine solvent to form a mesityl precursor solution;

mixing said mesityl precursor solution in a hexadecylamine solvent at a temperature of approximately 300° C. to form coinage-metal nanoparticles in solution;

adding methanol to form a precipitate; and separating the precipitate to form silver nanoparticles with diameters of approximately 9 nm.

11. A method of making gold nanoparticles, comprising:

dissolving a solution of $(Au(C_6H_2(CH_3)_3)_5$ in an octylamine solvent to form a mesityl precursor solution;

mixing said mesityl precursor solution in a hexadecylamine solvent at a temperature greater than 100° C. to form coinage-metal nanoparticles in solution;

adding methanol to form a precipitate; and separating the precipitate to form gold nanoparticles.

12. The method of claim 11 wherein said temperature was 300° C. to form gold nanoparticles with diameters of between approximately 10 nm to approximately 80 nm.

13. The method of claim 11 wherein said temperature was 190° C. to form gold nanoparticles with diameters of approximately 12 nm.

* * * * *